US005487460A

United States Patent [19]

Barnes

[11] Patent Number: 5,487,460

[45] Date of Patent: Jan. 30, 1996

[54] SHORT STRAND ORIENTER

[75] Inventor: Derek Barnes, West Vancouver, Canada

[73] Assignee: MacMillan Bloedel Limited, Vancouver

[21] Appl. No.: 283,018

[22] Filed: Jul. 29, 1994

[51] Int. Cl.[6] .......... B65G 47/24

[52] U.S. Cl. .......... 198/382

[58] Field of Search .......... 198/382, 383, 198/396, 533, 390, 392, 393, 397; 425/81.1, 82.1, 83.1, 110

[56] References Cited

U.S. PATENT DOCUMENTS

| | | | |
|---|---|---|---|
| 3,115,431 | 12/1963 | Stokes et al. . | |
| 3,807,931 | 4/1974 | Wood et al. . | |
| 4,506,778 | 3/1985 | Kilpela | 198/382 |
| 4,623,058 | 11/1986 | Bossler | 198/382 |
| 4,666,029 | 5/1987 | Burkner | 198/382 |
| 5,325,954 | 7/1994 | Crittenden et al. | 198/382 |
| 5,404,990 | 4/1995 | Barnes et al. | 198/382 |

FOREIGN PATENT DOCUMENTS 920529 2/1973 .

*Primary Examiner*—Joseph E. Valenza
*Attorney, Agent, or Firm*—C. A. Rowley

[57] ABSTRACT

An orienter is formed by a plurality of decks including a upper deck, a bottom deck and at least one intermediate deck stacked one above the other, substantially vertically extending passages are defined in each of the decks, the width of the passages of the bottom deck is preselected to a width $Y_B$ sufficiently small to ensure the orientation of the strands to the desired mean orientation and relative to a direction substantially perpendicular to the direction in which the width have passages measured. The width of the passages above the lower deck are made progressively larger in accordance with the following formula: $2^{n-1}Y_B$ where n is the number of decks above the mat and $Y_B$ is the width of the passages through the bottom deck. The side passages in all the decks are substantially aligned vertically, with both the passages in the top deck bisected in two equal passages in the deck immediately therebelow.

11 Claims, 2 Drawing Sheets

SHORT STRAND ORIENTER

FIELD OF INVENTION

The present invention relates to a strand orienter, more particularly, the present invention relates to a multi-deck strand orienter for orienting strands without significant segregation of the strands by length.

BACKGROUND OF THE INVENTION

The concept of orienting strands by passing the strands through narrow vertical passages (compared with the axial length of the strands to be oriented) is practised in the wafer board or strand board industry and has been for some time.

One such device is shown in U.S. Pat. No. 3,115,431 issued Dec. 24, 1963, to Stokes et al. This device includes the plurality of intermeshed rotating disks mounted on a plurality of substantially parallel side-by-side shafts positioned-in a plane. The disks on the shafts are uniformly positioned intermediate disks on their adjacent shafts. In the arrangement described, the disks on adjacent shafts turn in the same direction, except for the last disks in the sequence which turn in the opposite direction. This type of arrangement (hereinbelow referred to as the Stoke's arrangement) has been found satisfactory particularly for use with long strands. The disclosure of the Stokes et al. patent is incorporated herein by reference.

Another similar device is shown in the Burkner U.S. Pat. No. 4,666,029 issued May 19, 1987 but wherein the disks on adjacent shafts are arranged in pairs in side by side relationship with the disks forming one of the pairs defining one side of an orienting passage and the disks forming the next axially space pair defining the other side of the passage. This arrangement (hereinafter referred to as Burkner's arrangement) is also satisfactory but the Stokes' arrangement is less complicated and appears to be about as effective in aligning the strands as the Burkner arrangement. The Burkner et al. patent is incorporated herein by reference.

Both of these devices use their rotating disks to carry the longer length strands that did not pass directly between the axially spaced disks along the top of the disks toward one end where the axial spacing between the disks is wider so that the long strands are preferentially positioned towards one end of the orienter and the short strands at the other.

In a modified version of the arrangements as described in Crittenden et al.'s U.S. Pat. No. 5,325,954 issued Jul. 5, 1994, at least a pair of decks, i.e. preorienter and orienter are used. This significantly improved the operation of the system and better ensures that the strands, in particular, long strands over about 6 inches pass through the vertical passages in the bottom orienting deck more easily by first tipping the strands via the disks in the preorienter and directing them more effectively into the relatively narrow passages in the orienter. This system provides a significant improvement over both the Burkner and Stokes arrangements and is particularly suited for handling long strands.

The orienting system of U.S. Pat. No. 5,325,954 generally employs a relatively long bottom deck with wider axial disk spacing toward one end of the orienter, but does not segregate the strands by length to the extent that occurs with the Burkner and Stokes arrangements.

It is known that the height of the lower edge of the bottom orienting deck above the mat or lay-up formed on the collecting belt has a significant influence on the retained orientation of the wafers or strands on the belt. The larger this space the greater the loss of orientation of the strands as attained in the orienter, thus it is preferred to keep this distance relatively small in the order of between 1 and 3 inches, preferably smaller to minimize this loss of orientation.

It will be apparent, if there is segregation of the strands by length, the strands are laid on the collecting belt over a longer length of the belt. This is not in itself a problem, however, if the distribution of strands along the length of the orienter is not uniform, the height of the mat above the belt will build at a nonuniform rate so that the height of the mat above the belt will form a hump towards one end of the orienter.

This means that the sloped bottom deck of the orienter must be adjusted to accommodate the hump so that the spacing between the bottom deck and the top of the strands on the belt may be set at the desired distance at the top of the hump but anywhere off the hump, so that the average angle of orientation of strands in this part of the orienter is significantly increased, i.e. orientation is lost.

U.S. Pat. No. 3,807,931 issued Apr. 30, 1974 to Wood et al. describes another form of orienter which uses a number of vertically stacked decks each formed by stationary vertical fins each provided with a vibrating cap that improve movement of the wood particle there between. Each deck has a number of fins that is a multiple of the number of fins in the deck immediately above it so that the fins on the upper deck directly overlie corresponding fins on the lower deck and the flow of strands is divided by the upper deck and the divisions so formed further subdivide by the next lower deck. In this device, the spacing between the fins on the top deck is about half the average length the strands that are to be oriented and the spacing between the upper and lower deck is defined as the distance greater than the average length of the strands. The orienting system of this patent clearly would not be effective for long wafers nor would it function well for conventional length (3 to 4 inch) strands.

Canadian patent 920,529 issued Feb. 6, 1973 to Turner et al. shows yet another form of orienter wherein partition walls are designed to move to prevent plugging.

BRIEF DESCRIPTION OF THE PRESENT INVENTION

It is an object of the present invention to provide a multi-deck orienting system controlling the strand throughout their passage there through to minimize segregation of the strands by length and reduce the possibilities of strands being caught in the orienter and causing blockage.

Broadly, the present invention relates to an orienting system for orienting wood strands comprising a top deck, a bottom deck and at least one intermediate deck between said upper and bottom decks to form a series of said decks stacked substantially vertically one above the other, substantially vertically extending passages through each of said decks, each of said passages being defined by a pair of spaced walls, said walls in at least said top deck being defined by axially spaced disks radially extending from a plurality of parallel shafts, said passages through said bottom deck having a preselected width y measured in a first direction between said walls of said bottom deck sufficiently small to ensure orientation of said strands passing therethrough to the desired mean angular deviation relative to a second direction substantially perpendicular to said first direction, said passages in an upper deck of a pair of vertically adjacent decks in said series have widths are correlated with passage widths of passages through the adjacent lower deck of said at least one pair of decks so that a passage through said upper deck of pair of adjacent decks in said series is bisected into two passages by passages formed through said lower deck of said pair of decks so that material passing downward though a passage in said upper deck falls on only one top edge of a common wall of said two passages in said lower deck and means to rotate said disks.

Preferably, the axial spacing of disks on the same shaft in said top deck will be at least equal to the maximum cut length of strand to be oriented.

Preferably, said walls of said passages in an upper deck are substantially vertically and axially aligned with walls of passages in a deck immediately therebelow, Preferably, said vertical passages in each of said intermediate and said top decks positioned above said bottom deck have a width substantially equivalent to $(2)^n y$ for a Stokes disk arrangement where n is the number of decks above said bottom deck.

Preferably, at least the upper edges of all of said passages are formed by edges of disks mounted in axially spaced relationship on shafts Preferably, said walls of said passages in all of said decks will be formed by axially spaced disks mounted on said shafts.

Preferably, all of said shafts in any one of said decks will be arranged in a plane.

Preferably, said disks on one shaft will be mounted midway between said disks on an adjacent shaft in each of said decks.

Preferably, said shaft in adjacent decks will be arranged in substantially the same vertical plane.

BRIEF DESCRIPTION OF THE DRAWINGS

Further features, objects and advantages will be evident from the following detailed description of the preferred embodiments of the present invention taken in conjunction with the accompanying drawings in which.

DESCRIPTION OF THE PREFERRED EMBODIMENTS

Figure 1:
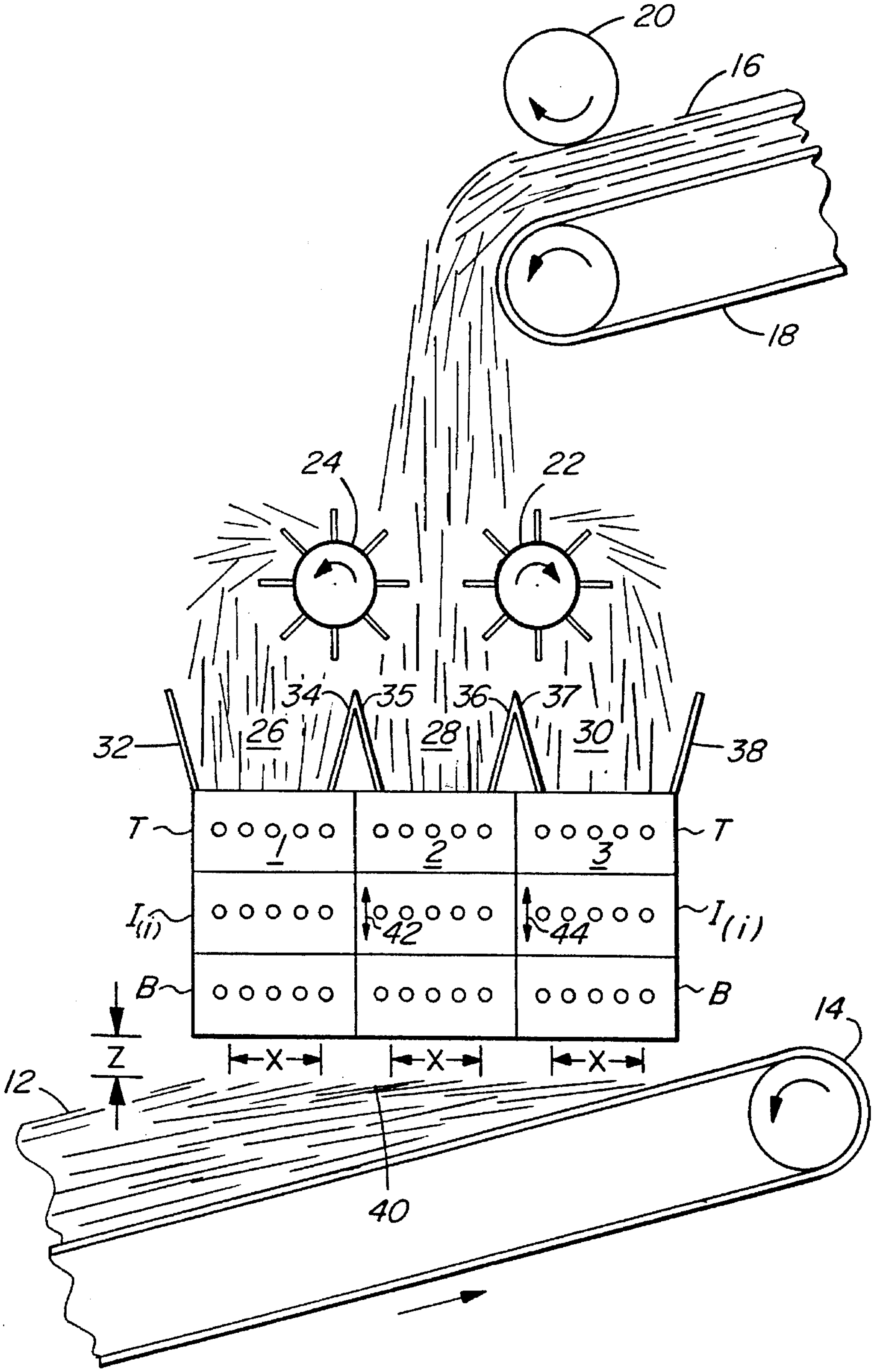
FIG. 1 shows a schematic arrangement of a plurality of orienting systems constructed in accordance with the present invention and arranged in side by side relationship.

FIG. 1 shows an orienter incorporating three orienting systems constructed in accordance with the present invention as indicated at 1, 2 and 3 arranged in side by side relationship for laying a mat or lay-up indicated at 12 on a conveyor or the like 14. The mat 12 forms a lay up for manufacture of consolidated composite wood products from the material (wood strands) orienters 1, 2 and 3. It will be apparent that while 3 orienting system constructed according to the present invention have been shown in FIG. 1 show how the systems may be—placed to take full advantage of a specific type of distribution system feeding an orienting system constructed in accordance with the present invention i.e. any one or more of the systems 1, 2 or 3 may be used independently or in combination with other orienting systems of the present invention.

The wood strands normally used with the orienter system of the present invention may have any reasonable length—generally, less than about 12 inches, a thickness less than about 0.25 inches, normally less than about 0.05 inches, a width generally about ½ inch and up to about 3 inches with a length to width aspect ratio of at least 2.

In the arrangement illustrated, strands 16 are fed from a conveyor or the like 18 using a spiked picker roll or the like 20 to disperse the strands and feed them onto a pair of spaced apart distributing rolls 22 and 24 which are also in the form of spiked rollers mounted in parallel spaced part relationship so that in the illustrated arrangement, about one-third of the strands pass between distributor rolls 20 and 24 and form an in-feed for the orienting system 2, i.e. the middle orienting system, whereas the distributing roll 22 distributes another third of the flow onto the orienting system 3 and the roll 24 distributes the final third onto the orienting system 1. Preferably, but it is not necessary, the flow to each of the orienting systems 1, 2 and 3 will be essentially the same.

The incoming flows for the orienting systems 1, 2 and 3 as indicated at 26, 28 and 30 fall between partitions or directing walls 32, 34, 35, 36, 37, and 38 which delineate at least the incoming width of the strands 26, 28 and 30 and may, as will be described below, carry on to form boundary walls between the orienting systems 1, 2 and 3. These directing walls 32, 34, 35, 36, 37 and 38 direct the strands onto the upper or top deck of these respective orienting systems 1, 2 or 3 toward the periphery of the outside disks at a length preferably just inside of a vertical plane passing through the axis of those outside disks (see the partitions 32 and 34 in FIG. 2).

With the orienting systems of the present invention, substantially all of the strands in the flows 26, 28 and 30 passed directly through their respective orienting systems 1, 2 and 3 and leave their respective orienting systems over a relatively short length as indicated at x in the direction of movement of the conveyor.

This arrangement where the incoming strands in the flows 26, 28, 30 each pass out through its respective orienting systems 1, 2 and 3 as a relatively narrow stream measured in the mat or lay up length direction (x) ensures that there is substantially no segregation of the strands by length rather the strands are laid in a more homogenous manner. Generally, the length x will be in the range of about 1 to 3 feet.

Figure 2:
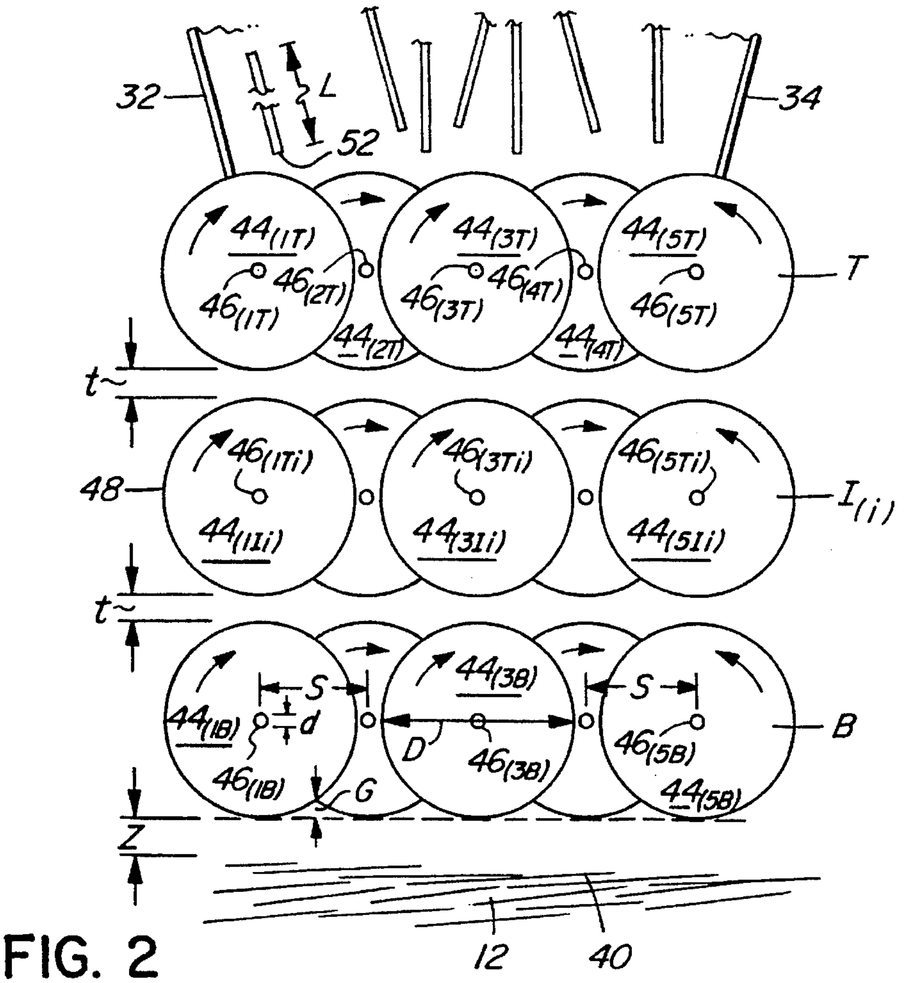
FIG. 2 is a section parallel to the direction of belt movement through a typical orienting system constructed in accordance with the present invention.

Furthermore, by concentrating the laying of the strands over a relatively short length x, the spacing z between the bottom of the orienting system and the top 40 of the mat being formed may be maintained relatively constant as indicated by the dimension z in FIGS. 1 and 2.

In the illustrated arrangement, the side by side orienting systems 1, 2 and 3 have been aligned horizontally. However, assuming the orienting system 1 is the datum, the orienting system 2 may be moved vertically as indicated by the arrow 42 relative to the system 1 and similarly the orienting system 3 may be displaced vertically as indicated by the arrow 44 relative to the orienting system 2 to position the bottom of each of the orienting systems relative to the top 40 of the mat being formed as required, i.e. if the spacing between the disk decks is significant, it may be more desirable to arrange the decks in a stepped relationship with the deck 3, i.e. upstream in the direction of movement in the belt being positioned closer to the belt than the other two.

It will be apparent that though three orienting systems 1, 2 and 3 have been shown in combination, present invention may be employed with a single orienting system or with two or more orienting systems. The use of three orienting systems is relatively convenient when a pair of distributing rolls, 22 and 24, are used as the main flow may be relatively easily be divided into three separate flows from a single source.

As schematically illustrated in FIG. 2, each of the orienting systems (only one will be described) is formed by at least three decks, a bottom deck B, at least one intermediate deck $I_{(i)}$ and a top deck T (see also FIG. 1).

In the illustrated arrangement, only one intermediate deck has been shown. However, as indicated by the $_{(i)}$ a number of intermediate decks may be provided as required to satisfy the requirements for the number of passage bisections based on the width y required in the bottom deck to obtain the required orientation and the length L of the strands being oriented as will be described below.

It is important that the disks 44 be driven and suitable means schematically represented by the arrows 52 will be provided to drive the disks 44—normally by driving the shafts 46. In the illustrated arrangement the disks at one end (off-going end) of the orienting system in each deck have been shown driven in the opposite direction to the other disks, however, this is not essential or even preferred.

The axes of the shafts 46 in the different decks are preferably arranged in a grid pattern. The axes of the shafts in a given deck are preferably all positioned in a plane (see planes 54, 56 and 58 designated by dot dash lines in FIG. 2) and the axes of the shafts in the series of stacked decks being positioned in stacked relationship in planes 60, 62, 64, 66 and 68 which are preferably substantially parallel. The planes 54, 56 and 58 are preferably parallel and extend in a direction preferably substantially perpendicular to the direction in which planes 60, 62, 64, 66 and 68 extend. Though the planes 54, 56 and 58 have been shown to extend substantially horizontally they may if desired be set to be substantially parallel to the top 40 of the mat being formed.

In any event, in the arrangement illustrated in FIG. 2, each of the decks B, $I_{(i)}$ and T are formed by a plurality of disks 44 mounted in axially spaced relationship on shafts 46. In the illustration in FIG. 2, the shafts with the top deck T have been indicated by a $_t$. Also, the position of shaft relative to one end (front) has been indicated numerically, i.e. in the 5 shaft system illustrated, as $_1$ for the shaft closest to the front 48 and $_5$ to the shaft farther from the from 48. Similar numbering has been used in each of the decks. Each of the intermediate deck being designated as $I_{(i)}$ the $_{(i)}$ indicating the position or number of decks that intermediate deck is above the bottom deck B and the shafts are indicated in a similar manner, i.e. $\mathbf{46}_{(1I1)}$ is the front (first) shaft on the intermediate deck immediately above the bottom deck B. The disks and shafts on the bottom deck B being indicated by the similar reference numerals but with the subscript B indicating the bottom deck, e.g. $\mathbf{46}_{1B}$.

In the illustration, all the disks, $\mathbf{44}_T$, $\mathbf{44}_{Ii}$ and $\mathbf{44}_B$ have essentially the same diameter D.

The spacing between the adjacent disks mounted on substantially vertically aligned shafts, i.e. shafts $\mathbf{46}_{(1T)}$, $\mathbf{46}_{(1I1)}$, $\mathbf{46}_{(IB)}$, etc. is indicated by the dimension t. This dimension t will normally be less than 2 inches and is likely to be closer to 1 inch and may be a negative number where the disks overlap.

Overlapping of the disks in one deck with disks in the adjacent higher or lower deck may be important where the overall height or the orienting system is important as overlapping significantly reduces the height of the system. The degree of overlap obviously must not be sufficient and the disks must be positioned on adjacent decks to ensure there is no interference between for the disks ion adjacent decks and one deck does not interfere with the operation of its adjacent decks.

The dimension D is correlated with the diameter d of the shaft 46 and the spacing S between shafts 46 in the same deck to ensure that the clearance between the shafts 46 in each deck is at least equal to the length of strand to be processed, i.e. ½(S-d) will normally be equal to at least the maximum length L of a strand being processed (see the strand 52 at the top of FIG. 2) and D/2=r will be slightly less than S-d to provide clearance..

Applicant has found that the dimension D of 16 inches using shafts of diameter equal to about 2 inches and spaced 9 inches to operate very satisfactory with wafers or strands having a maximum length of less than about 6½ inches and an average of about 5½ inches.

In the illustrated arrangement, the disk have been shown arranged as described as above as a Stokes arrangement. However, they can equally well be arranged as a Burkner arrangement. The Stokes arrangement is however, preferred since the number of decks required may be reduced relative to a Burkner arrangement.

It is important that in any pair of adjacent decks in the sequence e.g. decks $I_{(1)}$ and B that the strands falling through the passages $P_{(I1)}$ in deck $I_{(1)}$ to the passages $P_{(B)}$ can contact only one edge i.e. only the top of one of the walls of the passages $P_{(B)}$ in the deck B so that each passages $P_{(I1)}$ in an upper deck of the pair of adjacent decks is bisected into two passages $P_{(B)}$ through the lower deck of the pair. Preferably the passages in the upper deck will be bisected into two equal width passages in the lower deck and the total width of the two passages in the lower deck will be equal to the width of the passage in the upper deck of the pair (ignoring the disk or wall thickness measures axially of the shafts.

Figure 3:
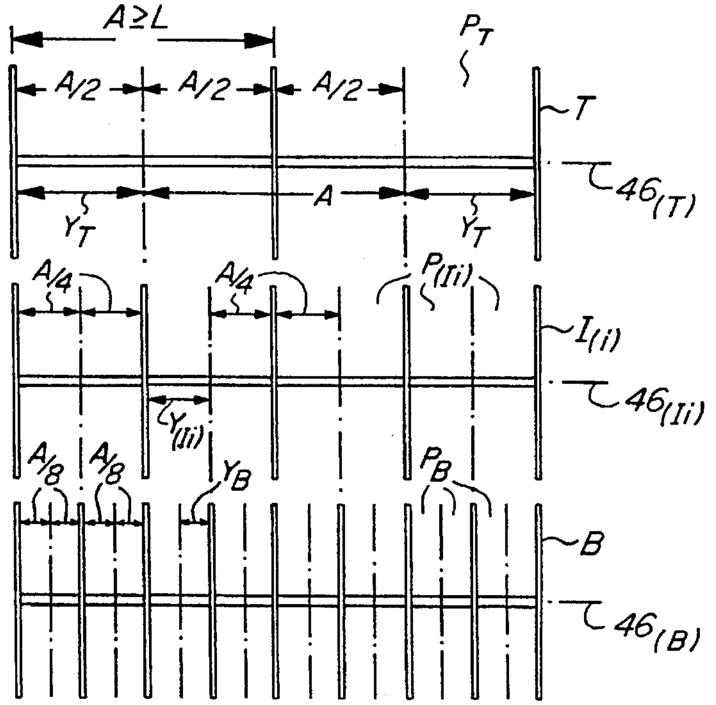
FIG. 3 is a schematic section along the lines 3—3 of FIG. 2 illustrating the preferred arrangement of the disks forming the side walls of the passage.

As shown in FIG. 3, the axial spacing between the adjacent disk 44 measured between the center of the disks (axial of the shafts—ignoring the disk or partition wall thickness measured axially of the shafts) in each of the deck is set up as follows: The axial spacing of the disk 44 on the deck B is set at the dimension $Y_b$ which is the required dimension to obtain the desired degree of orientation (mean angular deviation) of the strands forming the mat 12, then each of the decks positioned thereabove will preferably be sized in relation thereto to ensure that the vertical passages defined between the disks in each deck, i.e. the passages $P_T$, $P_{I(i)}$ and $P_B$ will increase in width according to the following formula:

$$Y_{(Pi)}=2^{(n)}Y_B$$

wherein $Y_B$ equals the width of the passages in the bottom deck, i.e. with the passages $P_B$ and n equals the position of the deck above the bottom deck counted from the bottom, i.e. the bottom deck is not counted (i.e. the bottom deck B is equal to n=0), the first intermediate deck is the first deck (n=1), etc. In the illustrated arrangement, the deck $I_{(i)}$ will be first deck up and the dimension $Y_{(Ii)}$ will be twice the dimension $Y_B$ and the dimension $Y_T$ of the upper deck, since there are only three decks, will be equal to $2^{(2)}$ $Y_B$ or 4 times $Y_B$.

It will be apparent that with the Stokes disk arrangement, the number of decks required is reduced relative to a Burkner arrangement since the width $Y_T$ is defined by disks on adjacent shafts bisecting the space between decks on the same shaft, i.e. in the Stokes arrangements the passage width is defined by the spacing between disks on adjacent shafts. With Burkner, the passage width is defined by the spacing between disks on the same shaft since the spacing between disks on the same shaft in the top deck is also dependent on the strand length L, i.e. at least as widely spaced as the length of the wafer, the number of decks required is less with Stokes then with Burkner.

As indicated, there is a minimum dimension between adjacent disks on the same shaft in the top deck equal to or greater than the maximum cut strand length L as indicated by the dimension A in FIG. 2.

When a Stokes arrangement is used, the disk on the adjacent shaft as indicated by the dotted line in FIG. 2 are a spaced distance A/2 in the top deck T; i.e. A/4 in the intermediate deck I, and A/8 in the bottom deck and with three decks as illustrated $A/2=Y_T=4Y_B$.

If the Burkner arrangement is used the number of decks required is higher as the effective of the offset of disks on adjacent shafts cannot be obtained yet the size of the passage is in each deck must be half the width of the passage through the deck immediately thereabove and the maximum width i.e. the width $Y_T$ must accommodate the strand length L requiring that the actual passage width between adjacent disks on the same shaft be equal to dimension A as opposed to the ½A when Stokes arrangement is used. The Stokes arrangement permits less decks because the strands see in any one position only that portion of the disk projecting above the disks on the adjacent shafts and thus the disk spacing on one shaft may be twice the required passage width.

It will be apparent that both the maximum wafer length and the degree of orientation will determine the number of intermediate decks that are required, it being important that the axial spacing in the bottom deck be narrow enough to obtain the required orientation and in the top deck be wider than the maximum cut length of the wafers being processed. For example, if a spacing of 1 inches between the disk $\mathbf{44}_B$, i.e. $Y_B=½$ inch and the maximum wafer length is say, 12 inches, then the first intermediate deck would have dimension $Y_{I1}$ of $2^{(1)}Y_B=1$ inch, the second intermediate disk deck would have passages with dimensions $Y_{I2}=2^{(2)}Y_B=2$ inches, the third deck will have passages of widths $Y_{I3}=2^{(3)}Y_B=4$ inches, and the next one would have dimension of $Y_{I4}=2^{(4)}Y_B=8$ inches and the top width $Y_T=2^{(5)}Y_B=16$ inches.

It will be noted that each of the passages $P_T$, $P_{I1}$ and $P_B$ in the illustrated arrangement are directly vertically in line with the passages immediately thereabove and in effect, bisect the passage immediately thereabove, i.e. when the position of the walls of a passage are defined in an upper deck, the decks therebelow will have passage walls (disks) in the same vertical plane.

The use of disks in at least the top row deck T is believed to be essential. However, in the intermediate decks it may be desirable to use vanes in place of the disks and certainly in the bottom deck, vanes may be used to replace the disk or in combination with disks to further improved orientation particularly to eliminate the gap g (shown in FIG. 2) and maintain a more accurate spacing between the bottom of the vanes indicated by dotted lines at 60 in FIG. 2.

In an experimental set up, 16 inch diameter disks mounted on 2 inch diameter shafts as above described were used in three different decks numbered 1, 2 and 3 respectively having axial disk spacings of 6 inches, 3 inches and 1.5 inches respectively, the number and arrangement of decks were varied and the gap spacing t=1 inch was used. In each test, 900 grams of 6 inch long strands were fed to the orienting systems having differing numbers and arrangements of decks The results of the tests are shown in Table I.

TABLE 1

| | | | | |
|---|---|---|---|---|
| Top Deck (deck no.) | 1 | None | None | None |
| Intermediate Deck (deck no.) | 2 | 2 | 1 | None |
| Bottom Deck (deck no.) | 3 | 3 | 3 | 3 |
| Overflow from end of Orienter (grams) | Nil | 250 | Nil | 550 |
| Footprint - Lenght of Laid Mat (inches) | 18 | >48 | 48 | >48 |

It is apparent that significantly more effective system in terms of avoiding segregation by length and ensuring high throughput per foot of orienter (measured in the plane of the shafts and perpendicular to the shafts) is provided when three decks are used in a system constructed in accordance with the present invention. When the present invention is not used, the foot print of the system increases significantly from 18 inch to at least 48 inches.

It is best when operating the orienter, to direct the main flow of strands onto the tops of disks toward a position directly above the shafts i.e. onto the tops of the disks spaced away from midway between the shafts as the greatest tendency or opportunity for plugging is at the point mid way between the shafts where the peripheries of the disks on adjacent shafts cross.

Having described the invention, modifications will be evident to those skilled in the art without departing from the scope of the invention as defined in the appended claims.

I claim:

1. An orienting system for orienting wood strands comprising at least three decks including a top deck, a bottom deck and at least one intermediate deck between said top and bottom decks to form a series of said at least three decks stacked substantially vertically one directly above the other, substantially vertically extending passages through each of said decks, each of said passages in each said deck having a width defined by a pair of spaced walls, said decks being in vertically adjacent pairs, each of said pairs composed of an upper deck which may be one of said top deck and said intermediate decks and a lower deck which may be one of said bottom deck or said intermediate decks, said passages through said bottom deck having a preselected width y measured in a first direction between and substantially perpendicular to said walls of said bottom deck, said width y being sufficiently small to ensure orientation of said strands passing therethrough to the desired mean angular deviation relative to a second direction substantially perpendicular to said first direction, said passages in an upper deck of each pair of vertically adjacent decks in said series have widths measured in said first direction correlated with passage widths of passages through its adjacent said lower deck of said pair of decks so that a passage through said upper deck of each said pair of adjacent decks is divided into two passages by passages directly therebelow formed through its adjacent said lower deck of said pair of vertically adjacent decks, the combined widths of said two passages directly therebelow being equal to the width of said passage through said upper deck so that strands falling downward though a passage in said upper deck may fall directly onto only one top edge of a common wall between its said two passages directly therebelow in said lower deck, said top deck forming an upper deck of one of said pairs of vertically adjacent decks and said bottom deck forming a lower deck of another of said pairs of vertically adjacent decks and each said intermediate deck forming an upper deck with its vertically adjacent lower deck and a lower deck with its immediately adjacent upper deck and wherein said walls of said passages in each said upper deck in each said pair of vertically adjacent decks are substantially vertically and axially aligned one with each outer walls of a pair of adjacent of said passages directly therebelow in its said lower deck immediately therebelow.

2. An orienting system as defined in claim 1 wherein said walls in at least said top deck are defined by axially spaced disks radially extending from a plurality of parallel shafts, means to rotate said disks, the axial spacing between disks on the same shaft in said top deck is at least as wide as the maximum length of strand to be fed thereto.

3. An orienting system as defined in claim 1 wherein said walls of said passages in all of said decks are formed by said axially spaced disks radially extending from parallel shafts.

4. An orienting system as defined in claim 3 wherein said vertical passages in each of said intermediate and said top decks positioned above said bottom deck have a width substantially equivalent to $(2)^n y$ for a Stokes disk arrangement where n is the number of decks above said bottom deck.

5. An orienting system as defined in claim 2 wherein said walls of said passages in all of said decks are formed by said axially spaced disks radially extending from parallel shafts.

6. An orienting system as defined in claim 5 wherein said vertical passages in each of said intermediate and said top decks positioned above said bottom deck have a width substantially equivalent to $(2)^n y$ for a Stokes disk arrangement where n is the number of decks above said bottom deck.

7. An orienting system as defined in claim 6 wherein said walls of said passages in all of said decks are formed by said axially spaced disks radially extending from parallel shafts.

8. An orienting system as defined in claim 7 wherein said vertical passages in each of said intermediate and said top decks positioned above said bottom deck have a width substantially equivalent to $(2)^n y$ for a Stokes disk arrangement where n is the number of decks above said bottom deck.

9. An orienting system as defined in claim 3 wherein said disks on one shaft are mounted midway between said disks on an adjacent shaft in each of said decks.

10. An orienting system as defined in claim 5 wherein said disks on one shaft are mounted midway between said disks on an adjacent shaft in each of said decks.

11. An orienting system as defined in claim 7 wherein said disks on one shaft are mounted midway between said disks on an adjacent shaft in each of said decks.

* * * * *